United States Patent [19]

Iana et al.

[11] Patent Number: 5,167,819
[45] Date of Patent: Dec. 1, 1992

[54] CANTEEN HAVING A REMOVABLY MOUNTED FILTER DEVICE

[75] Inventors: E. Charles Iana, 24 Bellevue Ave., Winchester, Mass. 01890; Michael R. McCray, Little Elm, Tex.

[73] Assignee: E. Charles Iana, Winchester, Mass.

[21] Appl. No.: 609,523

[22] Filed: Nov. 5, 1990

[51] Int. Cl.⁵ .............................................. B01D 24/00
[52] U.S. Cl. ....................... 210/474; 210/266; 210/416.3; 210/475; 222/189
[58] Field of Search ............ 210/474, 282, 244, 416.3, 210/286, 475, 266, 321.8; 222/189, 182, 400.8; 224/148

[56] References Cited

U.S. PATENT DOCUMENTS

| | | | |
|---|---|---|---|
| 2,738,105 | 3/1956 | Wolfer et al. | 222/189 |
| 3,333,741 | 12/1965 | Radcliffe | 222/189 |
| 3,335,917 | 6/1965 | Knight | 222/189 |
| 4,090,650 | 5/1978 | Gotta | 224/148 |
| 4,443,336 | 4/1984 | Bennethum | 210/282 |
| 4,714,550 | 12/1987 | Malson et al. | 210/282 |
| 4,800,018 | 1/1989 | Moser | 210/472 |
| 4,852,781 | 8/1989 | Shurnick et al. | 224/148 |
| 4,940,542 | 7/1990 | Simisu et al. | 210/321.8 |

FOREIGN PATENT DOCUMENTS 1023335 3/1966 United Kingdom ............ 210/416.3

Primary Examiner—Robert A. Dawson
Assistant Examiner—Ana M. Fortuna
Attorney, Agent, or Firm—Kriegsman & Kriegsman

[57] ABSTRACT

A canteen especially useful in contaminated environments includes a hollow watertight container adapted to hold a quantity of a drinking fluid and a filter device extending into the container through an opening at the top. The filter device comprises an elongated tubular member having disposed therein an air filter for filtering the air entering the container and a water filter for filtering the drinking fluid exiting the container. In using the canteen, air is drawn into the container through the air filter and drinking fluid is drawn out from the container through the water filter by suction.

12 Claims, 2 Drawing Sheets

CANTEEN HAVING A REMOVABLY MOUNTED FILTER DEVICE

BACKGROUND OF THE INVENTION

The present invention relates to a canteen having a removably mounted filter device which filters the air entering the canteen and the liquid extracted from the canteen.

In U.S. Pat. No. 4,852,781 there is disclosed a runner's portable water supply which comprises a water bottle with a special cap and sipping tube. The sipping tube is curved and only slightly flexible so that it can be bent, but retains its shape if the wearer does not bend it. The cap fits into the bottle neck in a liquid tight coupling and has a first interior surface slidably mating with the tube in a substantially liquid tight coupling and has a second interior tunnel permitting gas to enter the bottle but deflecting liquid so that liquid cannot splash out of the bottle. The bottle is coupled to a selected part of the wearer's body with the upper end of the tube near the wearer's mouth and the lower end of the tube near the bottom interior surface of the bottle. Air flows into the bottle as liquid is sipped out. The bottle need not be held.

In U.S. Pat. No. 4,714,550 there is disclosed a water purifying system which includes an elongate chambered purifying assembly sized to be detachably mounted in a conventional canteen. The assembly is provided with an internal chamber filled with a particulate water purifying material and concentric tubes within the chamber require water flowing into the chamber through a filtered inlet at the bottom of the assembly to flow an extended chambered flow path through the purifying material to an outlet at the top of the assembly. The assembly includes a manually operable pump for presurizing said container, thereby pumping water from the canteen through the purifying assembly.

In U.S. Pat. No. 4,443,336 there is disclosed a portable filter unit comprising an outer flexible container including top, an upper compartment of flexible material enclosed in the container, a lower compartment of flexible material enclosed in the container, a tube communicating between the lower compartment and the upper end of the container and including an upper end and a lower end, a rigid filter means mounted in the container intermediate the compartment, and a filter means including a pair of separate filter units, one communicating between the upper and lower compartments and the other between the lower compartment and the lower end of said tube, respectively.

In U.S. Pat. No. 4,298,475 there is disclosed a portable water purifier comprising an elongated tube having a filtering agent, a bactericidal agent and an absorbent material retained in the tube. The user supplies suction from the mouth to draw water through the tube for filtering out foreign material and purifying the water prior to use.

In U.S. Pat. No. 4,090,650 a canteen is provided with a drinking straw extending through the top of the screw cap of the canteen. The straw may be pushed substantially completely into the canteen when the straw is not used or it may be withdrawn from the canteen to a substantial length such that one may drink from the canteen without removing it, for example, from a belt. The screw cap and canteen neck are provided with cooperating elements which pinch the straw closed in the closed position of the cap.

In U.S. Pat. No. 3,731,717 there is disclosed an improved protective mask means having a drinking and resuscitation connection means to permit drinking and resuscitation while wearing the mask in a contaminated atmosphere.

In U.S. Pat. No. 2,738,105 there is disclosed a canteen comprising a canteen case having an apertured portion, a cap releasably mounted on said apertured portion, a suction drinking tube affixed to an extending generally coaxially with said cap into the interior of said canteen case, a filtering element comprising a plurality of disks mounted on an apertured tube, said apertured tube having its upper end extending into an annular opening in the bottom of said cap and engaging an annular flange of said cap, means releasably secured to the lower end of said drinking tube for pressing said filtering element into engagement with said cap, a pressure equalizing tube extending into said case, and a check valve on said pressure equalizing tube preventing flow of liquid from said case to said equalizing tube.

It is an object of this invention to provide a canteen which is constructed so that liquid can be extracted therefrom while in a contanimated environment.

It is another object of this invention to provide a canteen which can be used with a gas mask while the gas mask is being worn.

It is another object of this invention to provide a canteen which includes a filter device for removing contaminants which might enter the canteen and wherein liquid is extracted through the filter device by suction.

It is yet still another object of this invention to provide a new and improved filter device for use in canteens and other containers for holding liquids.

It is a further object of this invention to provide a canteen which includes a filter device having no moving parts and which does not have to be held by the user to extract liquid from inside the canteen.

SUMMARY OF THE INVENTION

A canteen constructed according to the teachings of the present invention comprises a hollow watertight container and a filter device. The filter device extends into the container and comprises an elongated tubular member having inside therein an air filter for filtering the air entering the container and a water filter for filtering the water exiting the container. In using the canteen, liquid disposed inside the canteen is extracted through the water filter by suction and is replaced by air which enters the canteen through the air filter.

Various features and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERED EMBODIMENTS

Figure 1:
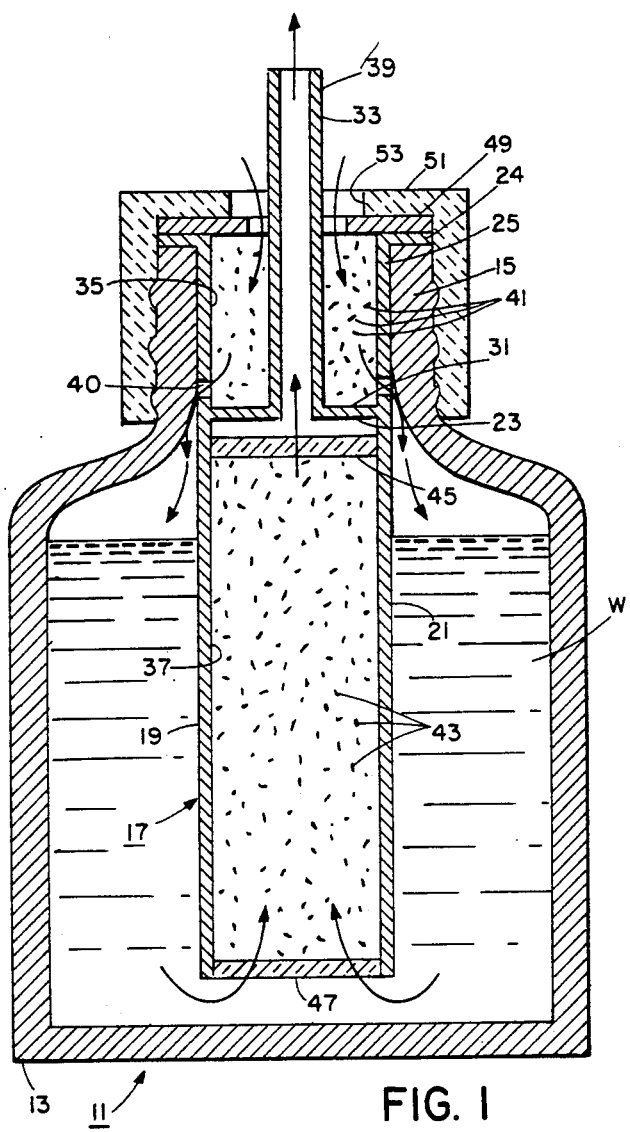
FIG. 1 is a cross-sectional view of a canteen constructed according to the teachings of the present invention.

Referring now to the drawings, there is shown in FIG. 1 a cross-sectional view of a canteen constructed according to the teachings of the present invention, the canteen being identified by reference numeral 11.

Canteen 11 comprises a container 13 of conventional size and shape. Container 13 includes an externally threaded neck 15. Container 13 is made of any suitable sturdy, rigid, durable material normally used in the fabrication of canteens, such as aluminum or polypropylene.

A filter device 17 is removably mounted in container 13 and serves to filter the air entering the interior of container 13 and also the liquid exiting container 13.

Filter device 17 includes a housing 19 having an outer wall 21 and an inner wall 23. Outer wall 21 is substanially cylindrically shaped. The diameter of device 17 is such that it may be inserted into or withdrawn from container 13 through neck 15. A radially outwardly projecting flange 24 extends around the periphery of outer wall 21 at its upper end 25 and rests on the upper end of neck 15. The length of housing 19 is such that when flange 24 rests on neck 15, the lower end 27 of housing 19 is closely adjacent the bottom 29 of container 13. Inner wall 23 is shaped to define a generally circular base portion 31 and tubular portion 33. Inner wall 23 serves to divide the area inside the outer wall 21 into an upper chamber 35 and a lower chamber 37. In addition, inner wall 23 is shaped to define a cylindrically shaped upper portion 39 which extends up beyond flange 23 and serves as a drinking tube through which liquid may be extracted from inside of canteen 11. Housing 19 is made of a suitable rigid durable material such as polypropylene. For a conventional 9" canteen, device 17 has a diameter d of about 0.9375 inches an internal length ll of about 8.75 inches and upper chamber 35 has a length l2 of about 0.750 inches.

A plurality of outlet ports 40 are formed in outer wall 21 above base portion 31.

A quantity of filter media 41 is disposed in upper chamber 35 and a quantity of filter media 43 is disposed in lower chamber 37. Filter media 41 seves as an air filter as will hereinafter be explained and may be, for example, silver impregnated grannular activated carbon. Filter media 43 serves as a water filter as will hereinafter be explained and also may be, for example, silver impregnated grannular activated carbon.

Filter media 43 is held in place inside housing 19 by upper and lower screens 45 and 47 which are disc shaped. Upper screen 45 is press fit into place and also serves as the outlet for lower chamber 37. Lower screen 47 is ultrasonically welded in place and also serves as the inlet to lower chamber 37. Screens 45 and 47 are each made of polypropylene or other suitable material.

Figure 3:
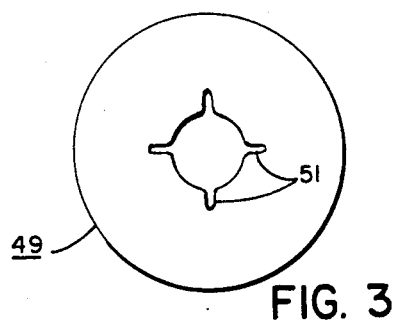
FIG. 3 is a plan view of the cover plate in the filter device in the canteen shown in FIG. 1.
Figure 2:
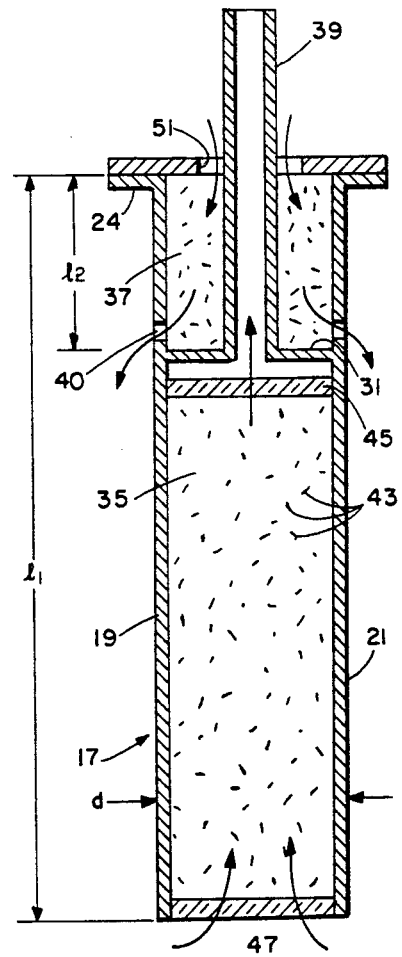
FIG. 2 is a cross section view of the filter device in the canteen shown in FIG. 1.

An annular shaped cover 49 also made of a suitable material such as polypropylene is fixedly attached to flange 23 by ultrasonic welding or other suitable means. Cover 49 includes a plurality of slit notches 51 (see FIG. 3) which serve as vent holes to allow air to get into upper chamber 35.

A removable cap 51 is threadably received on neck 15 of container 13. Cap 51 includes a central opening 53 which is larger in cross sectional size than tube 39 for receiving air from outside of canteen 11.

Canteen 11 is filled with water (or other liquid) by unscrewing cap 51, lifting out filter device 17 and then pouring the water in through neck 15.

In use, water W is dispensed from inside of container 13 by applying suction to the top end of tube 39. This causes water W to enter lower chamber 37 through screen 47, pass through filter media 43 and then exit through tube 39. At the same time this causes air to enter container 13, passing through opening 53 in cap 51, then through slit nothes 51 in cover 49, then through filter media 41 and then through outlet ports 39 in housing walll 13. As can be appreciated canteen need not be held by the user and is not tipped to extract water.

Figure 4:
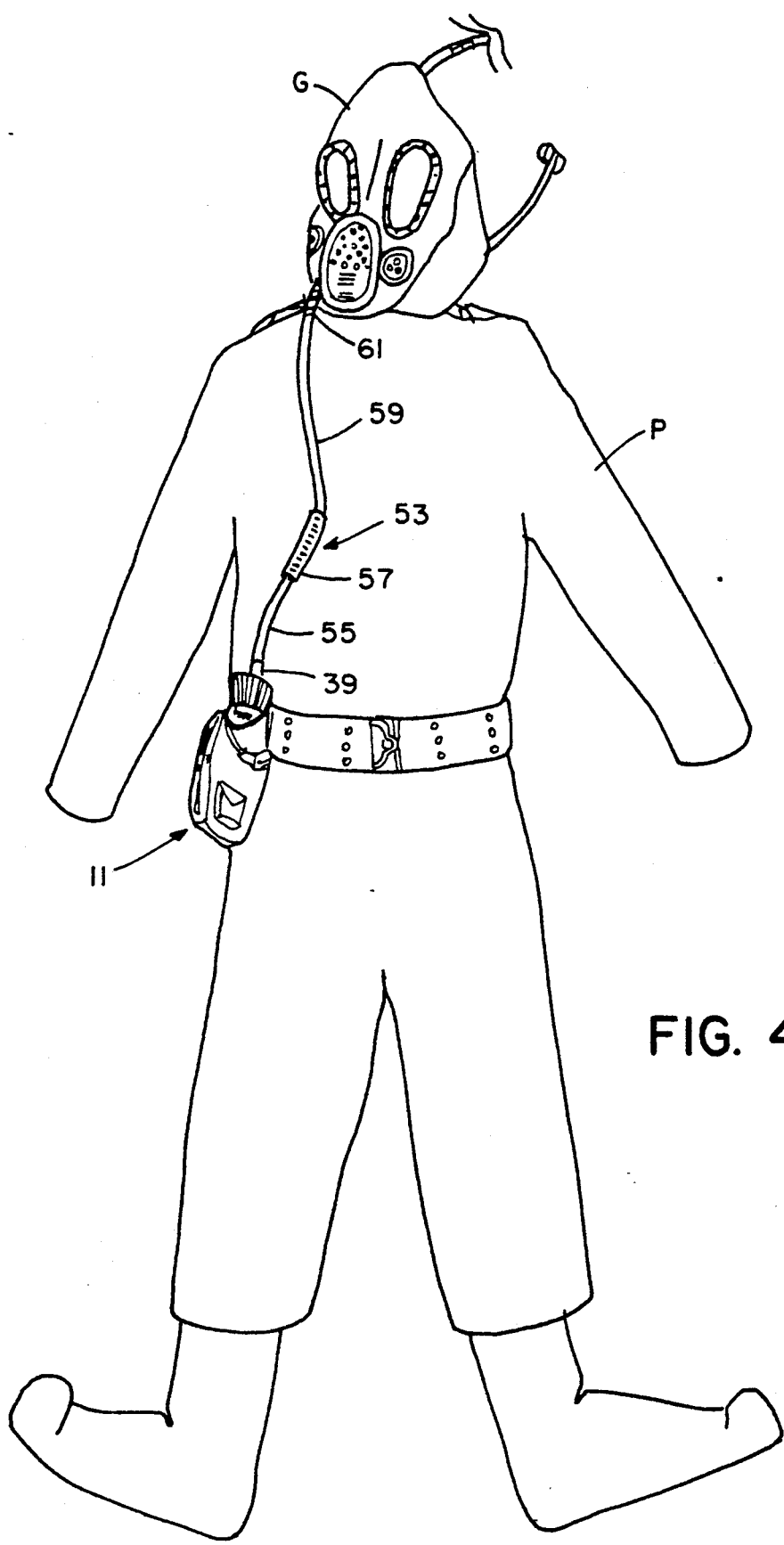
FIG. 4 illustrates how the canteen shown in FIG. 1 may be used by a person wearing a gas mask.

Referring now to FIG. 4 there is illustrated how canteen 11 may be attached directly to a gas mask G being worn by a person P. The connection system 53 includes a first hose 55 which is removably mounted at its lower end to tube 39 and fixedly attached at its upper end to the lower end of a filter unit 57. The upper end of filter unit 57 is fixedly attached to the lower end of a second hose 59. The upper end of second hose 59 is removably attached to tube 61 on gas mask G.

It is to be understood that various modifications can be made and that the invention is limited only by the claims.

For example, instead of being separate parts, the cover and the cap could be a unitary structure.

Also, in addition to silver impregnated grannular activated carbon, other materials which serve as filter media could be employed. These include any combination of the following compounds: exchange resins such as Purlite A.600 or A.400 etc., Aldex-C .800. F, KDF, Manganese green sand, Nitra-Out and Notim; all such compounds being used in combination with grannular activated carbon or impregnated grannular activated carbon.

Furthermore, the container with which the invention is applicable is not limited to canteens and not limited to any particular size liquid holding container, hard walled or soft walled.

also, purifying media may be added to the filter media, if desired.

What is claimed is:

1. A canteen comprising:
   a. a hollow watertight container adapted to hold a quantity of a drinking fluid, said container having a neck ar its upper end, and
   b. an elongated tubular filter device extending into said container through said neck, said filter device filtering air entering the interior of the container from the exterior atmosphere and filtering drinking fluid exiting the container.

2. The canteen of claim 1 wherein said elongated tubular filter device comprises an air filter for receiving and filtering the air entering the container and a water filter for receiving and filtering the drinking fluid exiting the container.

3. The container of claim 1 further including a cap removably mounted on said neck of said canteen.

4. The container of claim 3 wherein said cap has an opening sized to allow air to enter the upper chamber and to accommodate said drinking tube.

5. The container of claim 1 wherein said filter device includes an upper chamber and wherein said filter device includes an upper chamber and wherein said upper chamber has an inlet for receiving air from outside the container and an outlet for communicating with the interior of said container.

6. The container of claim 1 wherein said container is made of a sturdy rigid material.

7. In a container adapted to hold a quantity of a drinking fluid and having a neck at its upper end, the improvement comprises an elongated tubular filter device extending down into said container through said neck and constructed for filtering air entering the interior of container from the exterior atmosphere through said neck and for filtering drinking fluid exiting the container through said neck.

8. A canteen comprising:
 a. a hollow watertight container adapted to hold a quantity of a drinking fluid, said container having a neck at its upper end, and
 b. a filter device extending into said container through said neck, said filter device filtering air entering the container and filtering drinking fluid exiting the container, said filter device comprising an air filter for receiving and filtering the air entering the container, a water filter for receiving and filtering the drinking fluid exiting the container and a housing having a cylindrically shaped outer wall and an inner wall, said inner wall being shaped to divide said filter device into an upper chamber and a lower chamber, said air filter being disposed in said upper chamber and said water filter being disposed in said lower chamber.

9. The container of claim 8 wherein said housing is further shaped to include a tube extending down through said upper chamber to said lower chamber and serving as an outlet for said lower chamber for enabling drinking fluid in said container to be extracted therefrom by suction.

10. The container of claim 9 wherein said air filter comprises a quantity of silver impregnated grannular activated carbon.

11. The container of claim 9 wherein said water filter comprises a quantity of silver impregnated grannular activated carbon.

12. The container of claim 9 further including lower and upper screens for holding said water filter in said lower chamber and serving as an inlet and an outlet respectively for said lower chamber.

* * * * *